US007125056B2

(12) United States Patent
Saarem

(10) Patent No.: US 7,125,056 B2
(45) Date of Patent: Oct. 24, 2006

(54) TOGGLE LOCKED COUPLING

(76) Inventor: Myrl J. Saarem, 2057 W. Washington St., Carson City, NV (US) 89703

( * ) Notice: Subject to any disclaimer, the term of this patent is extended or adjusted under 35 U.S.C. 154(b) by 0 days.

(21) Appl. No.: 10/810,865

(22) Filed: Mar. 29, 2004

(65) Prior Publication Data
US 2005/0212294 A1    Sep. 29, 2005

(51) Int. Cl.
*F16L 21/00* (2006.01)
(52) U.S. Cl. ...................... 285/419; 285/373
(58) Field of Classification Search ............... 285/409, 285/65, 906, 373, 364, 233, 234, 112, 325
See application file for complete search history.

(56) References Cited

U.S. PATENT DOCUMENTS

| 1,369,913 | A | * | 3/1921 | Brunhoff ................. 285/373 |
| 2,449,795 | A | * | 9/1948 | Stillwagon ............... 285/373 |
| 2,913,262 | A |   | 11/1959 | De Cenzo |
| 3,189,970 | A | * | 6/1965 | Barr ....................... 285/373 |
| 3,540,758 | A | * | 11/1970 | Torres ..................... 285/233 |
| 4,008,937 | A |   | 2/1977 | Filippi |
| 4,346,428 | A |   | 8/1982 | Gale |
| 4,898,407 | A | * | 2/1990 | Zeidler .................... 285/328 |
| 5,380,052 | A |   | 1/1995 | Hendrickson |
| 5,947,532 | A |   | 9/1999 | Lorenz |
| 6,302,450 | B1 | * | 10/2001 | Dole et al. ............... 285/373 |
| D470,282 | S | * | 2/2003 | Bjork ...................... D32/25 |

OTHER PUBLICATIONS

Brochure from Cabletec®—Title: Two-Piece Plastic Removable Couplings. Dated © 1999 Cabletec.

* cited by examiner

*Primary Examiner*—Aaron Dunwoody

(57) ABSTRACT

A coupling is provided for joining the ends of relatively soft plastic conduit. Hinged shell halves contain gripping teeth that penetrate and secure the conduit ends together. Penetration of the gripping teeth into the plastic conduit is accomplished by toggle clamps that supply the necessary embedding force. A seal is provided that prevents leakage into or out of the joint between the conduit ends.

4 Claims, 3 Drawing Sheets

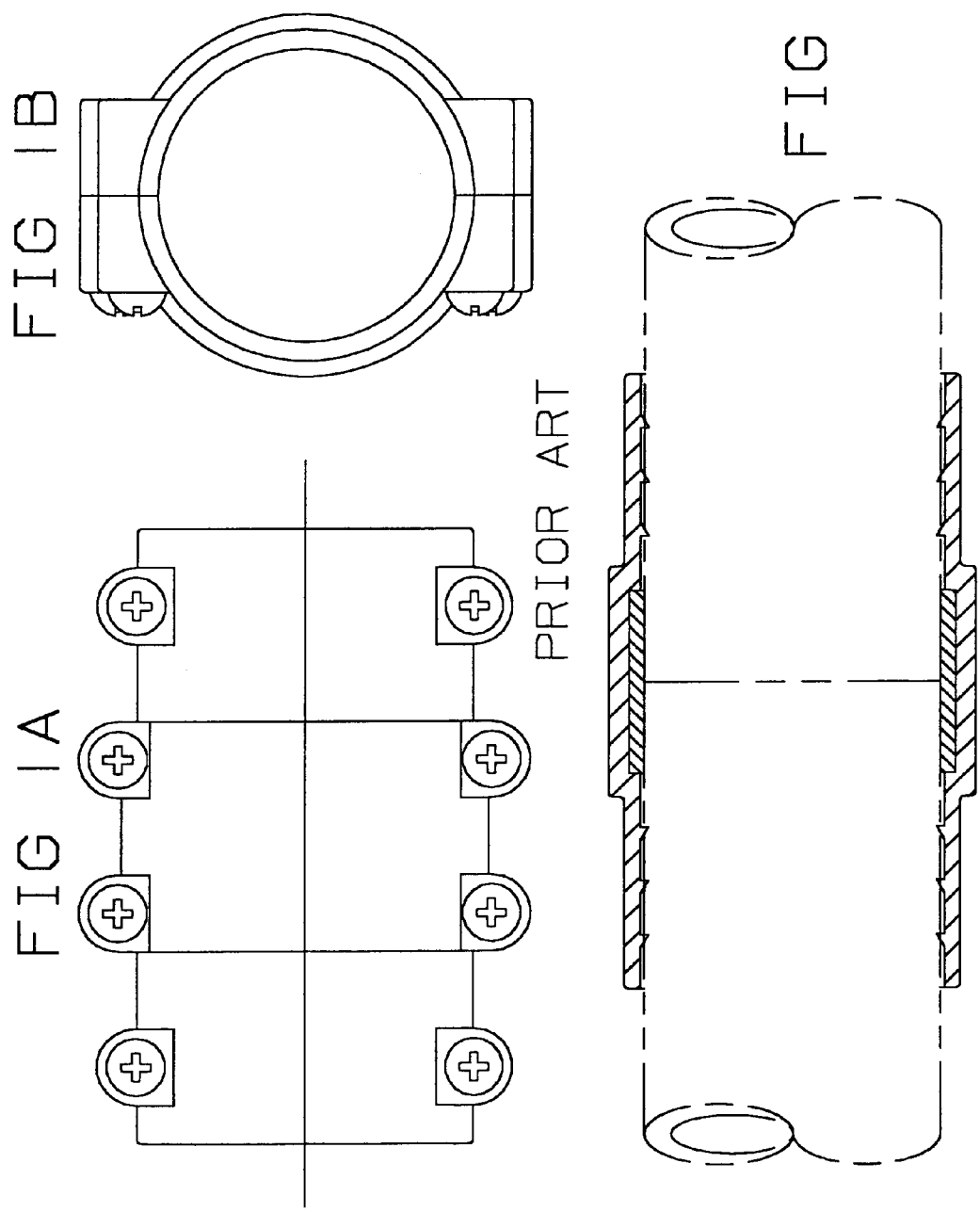

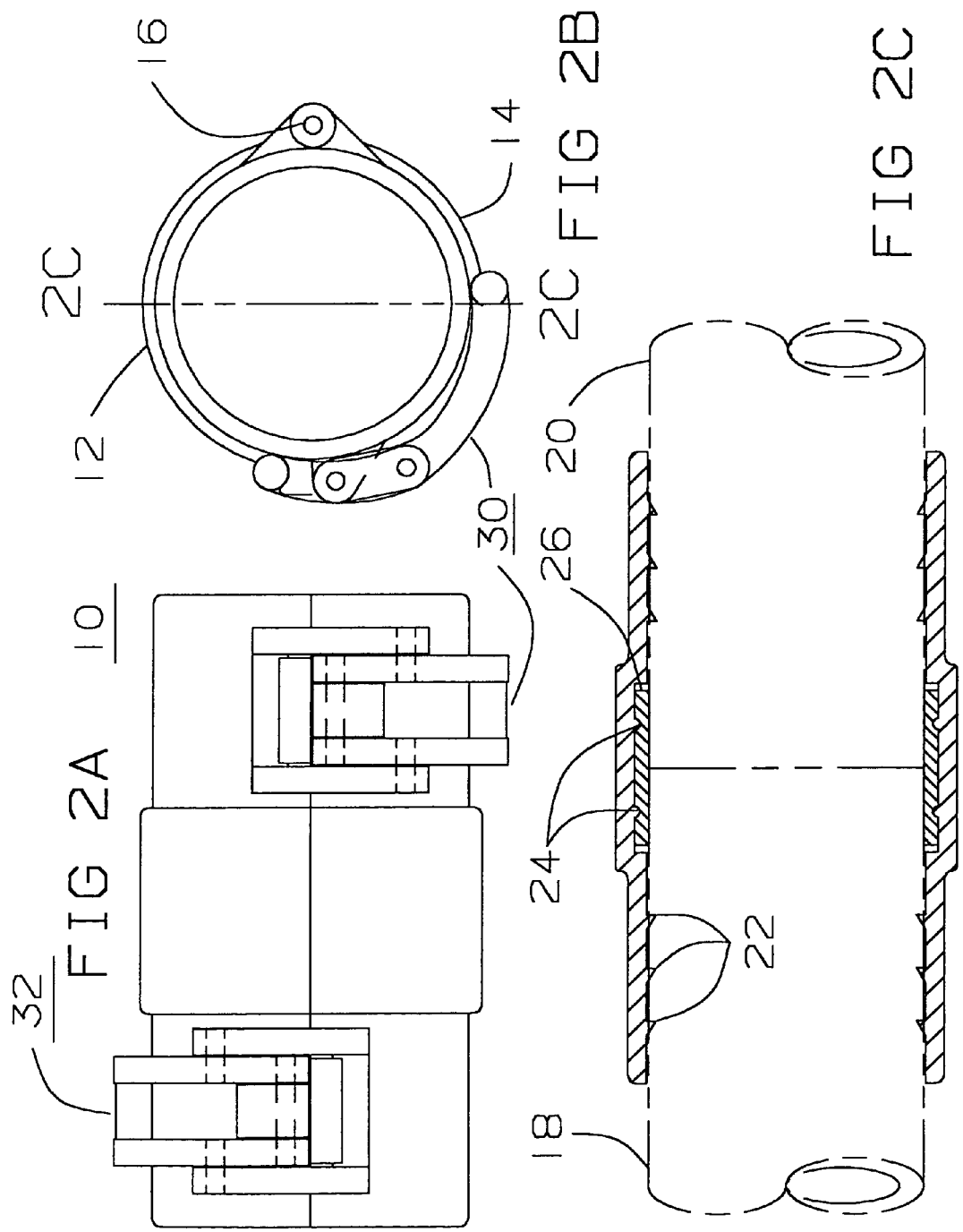

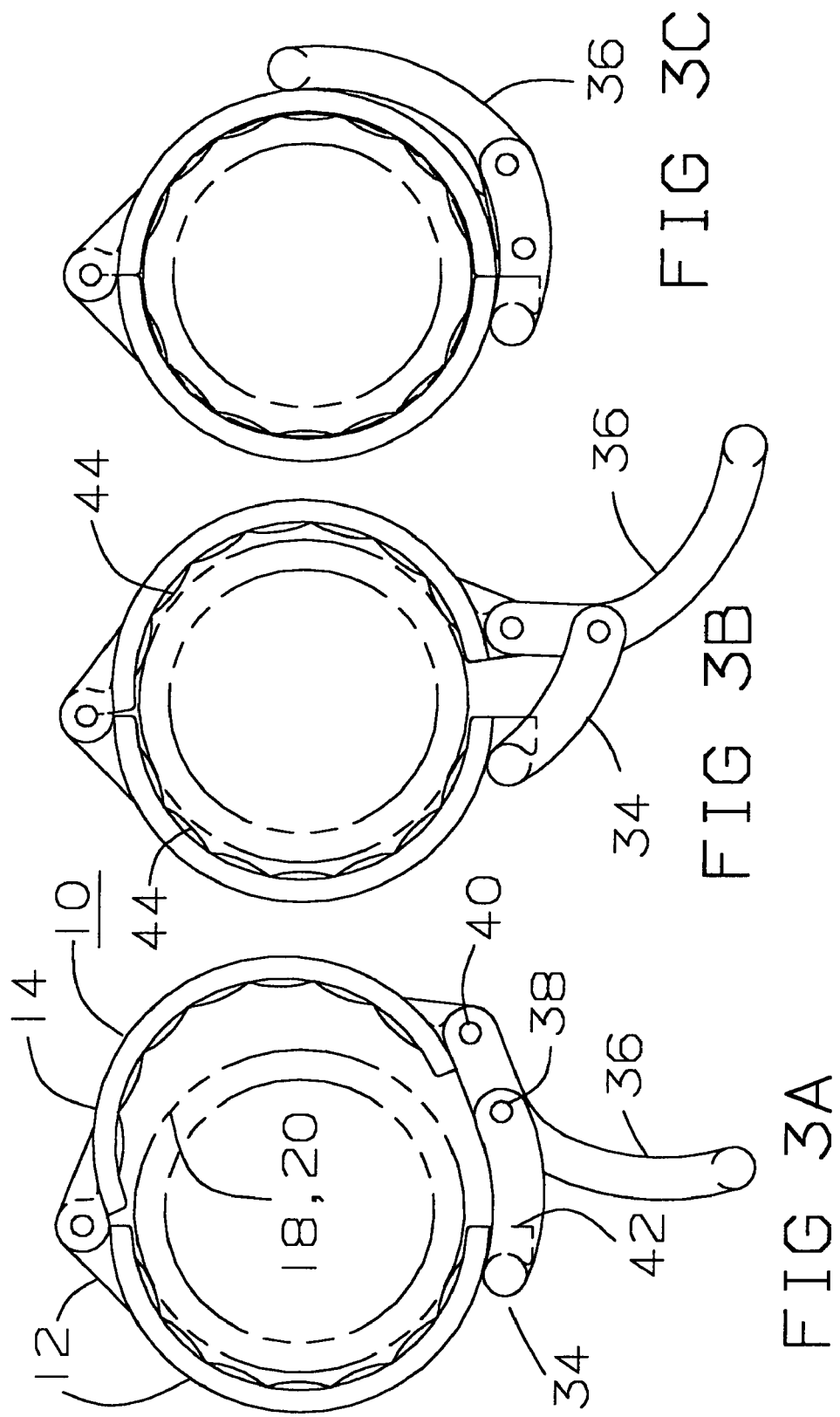

TOGGLE LOCKED COUPLING

FIELD OF THE INVENTION

The present invention relates to joining one conduit to another, and in particular, to coupling assemblies that join conduit that are made of relatively soft plastic material, such as high density polypropylene and high density polyethylene. The present invention finds particular utility in coupling collinear conduits that house fiber optic cables, electric cables and the like.

BACKGROUND ART

High-density polypropylene and polyethylene conduit are often laid underground in long lengths. Splices are required to join one length of conduit to the next. Fiber optic cables, or the like, are then installed in the length of conduit. Relatively smooth interior surfaces are required throughout the conduit length, including the splices, in order to facilitate the installation of the cable. The joints or splices need to be relatively airtight since air pressure is often used to install (blow) the cable through the conduit. Therefore, the coupling must provide a smooth interior surface and a relatively airtight joint.

A brochure from Cabletec®, with a title "Two-Piece PLASTIC REMOVABLE COUPLINGS:", describes a series of different size couplings currently used in this field. The essence of Cabletec® part number PE1.900-2 is shown in FIG. 1. This prior art utilizes two half shells that are bolted together in such a way as to clamp the abutting ends of the conduits. Circumferential gripper rings in the half shells are utilized to bite into the conduit in order to resist axial separation forces. A seal is provided to prevent leakage in or out of the conduit joint. Tools are required to install the coupling.

U.S. Pat. No. 5,947,532 issued to Lorenz shows prior art of a "stab" type coupling. The conduit ends are inserted ("stabbed") into a structure that contains a flexible collet. The collet is supported by an inclined surface in the structure in such a way as to permit insertion of the conduit into the structure, but prevents retraction. No tools are required for installation. However, after the conduit is inserted, it must be retracted some finite distance in order to activate the bite of the collet into the conduit. This is an obstacle in certain installations. Further, this coupling cannot be removed from the conduit without destroying the coupling or damaging the conduit.

U.S. Pat. Nos. 2,913,262 issued to De Cenzo et al, 4,008,937 issued to Filippi, 4,346,428 issued to Gale, and 5,380,052 issued to Hendrickson are all examples of couplings that utilize a toggle clamp to couple conduits. All of these examples require preparing the conduit ends with beads, threaded adaptors, grooves and the like. Therefore, the noted techniques would not be desirable or accepted in the field of the present invention.

SUMMARY OF THE INVENTION

In accordance with the present invention, a coupling is provided consisting of two hinged half shells that fit circumferentially around the terminal abutting ends of two collinear lengths of conduit. A seal is provided that bridges the gap at the abutment. The seal nests in a cavity in the shell halves. The cavity contains circumferential ribs that press the seal against the conduit to prevent leakage when the shell halves are closed. The internal surfaces of the shell halves contain teeth for gripping the conduit ends.

Toggle clamps are provided near the ends of the half shells. When the toggle clamps are actuated the half shells encompass and enclose the conduit and the teeth bite into the conduit. The toggle clamp latches over center and locks.

Thus, a coupling is provided that is inexpensive to manufacture, is easy to install, can be installed without tools, can be removed without destroying the conduit, rigidly couples the conduits, prevents leakage, and does not allow axial movement of the conduits.

Additional advantages will become apparent from the discussion that follows and the accompanying drawings.

BRIEF DESCRIPTION OF THE DRAWINGS

FIG. 1A is a frontal view, FIG. 1B is an end view, and FIG. 1C is a cross-sectional view of prior art, previously referenced.

FIG. 2A is a frontal view, FIG. 2B is an end view, and FIG. 2C is a cross-sectional view of the present invention.

FIGS. 3A, 3B and 3C show three views of the clamping action of the present invention in progressive toggle positions.

DETAILED DESCRIPTION OF THE INVENTION

In FIG. 2A the coupling 10 of the present invention is shown in a frontal view and in FIG. 2B as an end view. Coupling 10 is shown in a closed state. In FIG. 2B the half shell 12 and half shell 14 are joined by hinge pin 16. Additionally, a cross-section of the coupling 10, along line 2C—2C, is shown in FIG. 2C, depicting the joining of one end of a first conduit 18 to an abutting end of second conduit 20. When toggle clamps 30 and 32 are actuated to close the shell halves 12 and 14 around conduits 18 and 20, circumferential gripping teeth 22 bite into the soft plastic of conduits 18 and 20. Circumferential ribs 24 compress seal 26 into conduits 18 and 20. Seal 26 is made of resilient elastomer.

FIGS. 3A, 3B and 3C shows the actuation of toggle clamps 30 and 32.

In FIG. 3A coupling 10 has been opened to encompass conduit 18 or 20. Link 34 is attached to lever 36 by hinge pin 38. Lever 36 is attached to half shell 14 by hinge pin 40. Link 34 has just engaged catch 42.

In FIG. 3B lever 36 has been rotated to a position where gripping teeth 44 of half shells 12 and 14 have just engaged conduits 18 and 20.

In FIG. 3C lever 36 has been rotated to a closed and locked, over center position. Half shells 12 and 14 are rotated to fully engage conduits 18 and 20. Gripping teeth 44 have now been forced into full penetration of conduits 18 and 20.

Gripping teeth 22 of FIG. 2C are a plurality of continuous circumferential saw-tooth shaped ribs. Gripping teeth 44 are a plurality of scalloped saw-tooth shaped ribs as shown in FIG. 3B.

FIG. 2A shows toggle clamps 30 and 32 operating in opposite directions; one clockwise and the other counterclockwise. This allows the design of the half shells 12 and 14 to be identical. The parts required for toggle clamps 30 and 32 are also identical. Therefore, if these parts are cast or molded, the tooling for manufacture is minimized. However, toggle clamps 30 and 32 may be made to operate in the same direction, in which case the half shells 12 and 14 could not be identical.

Toggle clamps 30 and 32 are strategically located over gripping teeth 22 to provide maximum penetrating force to embed the gripping teeth 22 into conduits 18 and 20.

Although two toggle clamps are illustrated in this specification, more than two can be used.

Half shells 12 and 14 and toggle clamps 30 and 32 can be made of any convenient and adequate corrosion resistant material. Half shells 12 and 14 must be made of significantly harder material than the conduits 18 and 20. A material of choice is glass filled nylon.

CONCLUSION

The coupling, herein described, is an effective alternative to existing structures. It is cost effective, is easily installed without tools, is structurally sound, can easily be removed, is reusable, can be used for broken conduit repair, and is well suited for allowing cable insertions by conventional processes.

It will be appreciated that while particular embodiments of the invention have been shown and described, modifications may be made. It is intended in the claims to cover all modifications that come within the true spirit and scope of the invention.

I claim:

1. A coupling for joining abutting ends of relatively soft plastic conduits, comprising:
    a) two half shells with a plurality of gripping teeth that are circumferential ribbed saw toothed shaped scallops,
    b) a seal, and
    c) a plurality of toggle clamps,
whereby, actuation of said toggle clamps causes said half shells to encompass, grip, and lock together said conduit ends and said seal prevents leakage in or out of said conduit ends.

2. The coupling of claim 1 wherein said two half shells contain circumferential ribs that compress said seal into contact with said conduits.

3. The coupling of claim 1 wherein said two half shells are made of material significantly harder than said soft plastic conduits.

4. The coupling of claim 3 wherein said two half shells are made of relatively hard plastic material.

* * * * *